June 28, 1949.   M. L. DODGE   2,474,470
BELT SHIFTING MECHANISM

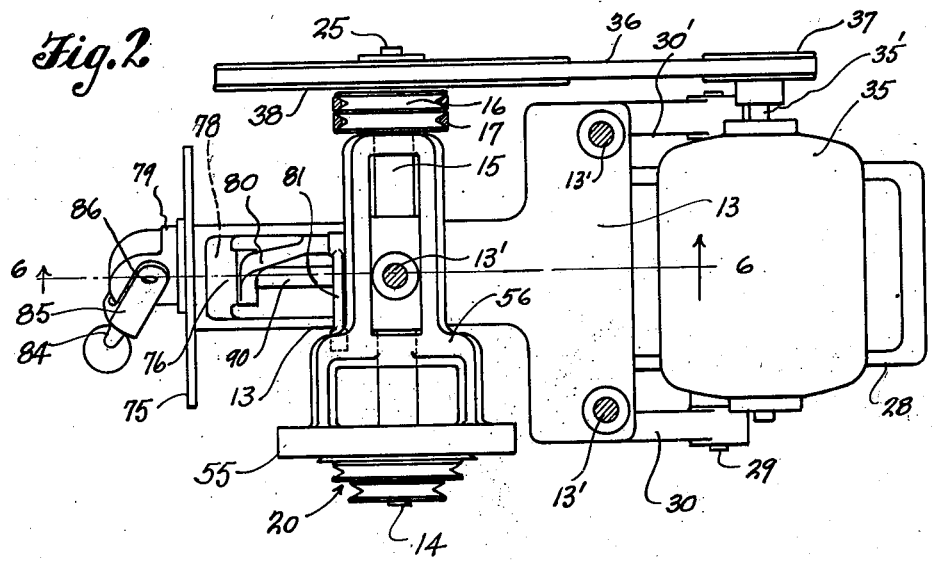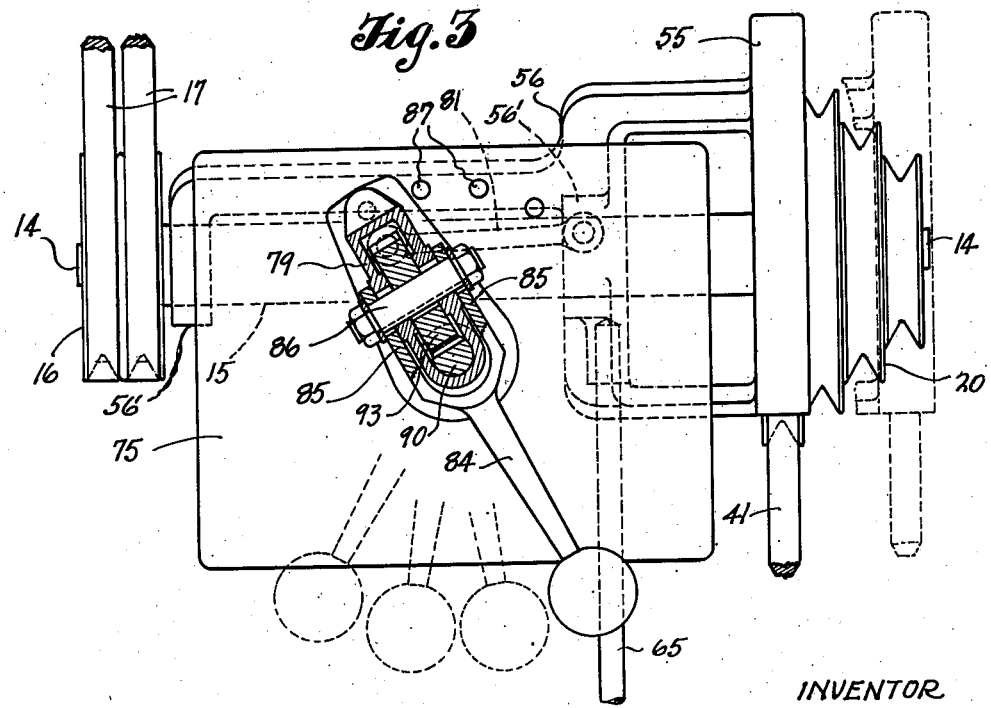

Filed Nov. 30, 1946   5 Sheets-Sheet 4

INVENTOR.
MERTON L. DODGE
BY
Cook + Robinson
ATTORNEYS

June 28, 1949. M. L. DODGE 2,474,470
BELT SHIFTING MECHANISM
Filed Nov. 30, 1946 5 Sheets-Sheet 5

INVENTOR
MERTON L. DODGE
BY Cook & Robinson
ATTORNEYS

Patented June 28, 1949

2,474,470

UNITED STATES PATENT OFFICE 2,474,470

BELT SHIFTING MECHANISM

Merton L. Dodge, Seattle, Wash.

Application November 30, 1946, Serial No. 713,222

5 Claims. (Cl. 74—242.3)

This invention relates to belt shifting mechanisms and it has reference more particularly to improvements in means for the shifting of a V-belt where such belt is used in connection with a pair of stepped pulleys and is shifted for the purpose of changing the speed and power ratios between the shafts on which the pulleys are mounted. For example, the invention may be embodied in a mechanism for use in connection with complemental or paired, stepped pulleys as used on a driving shaft and on the driven shaft of a turning lathe or the like. It is not the intent, however, that the invention be limited in its use either to any particular machine or even to V-belts.

It is the principal object of this invention to provide a comparatively simple, manually operable mechanism whereby a V-belt may be easily and quickly disengaged from the pulleys, shifted and selectively applied by belt carrier housings to any of the paired sets of grooves of the complemental stepped pulleys. Furthermore, it is an object of the invention to effect such an operation of releasing the belt, shifting and selectively applying it to the grooves of the pulleys, through the mediacy of a single control element.

Another object of my invention is to provide a belt shifting means that may be easily associated with present day belt slackening means as used in connection with V-belt drive pulleys.

It is a further object of the invention, to provide an indexing means in association with the single control element for accurately determining the position of the belt carrier housings, after the belt has been disengaged from the pulleys, for the application of the belt thereby to any selected pair of pulley grooves.

Other objects of the invention are to be found in the details of construction of parts; in the combination and relationship of parts and in the mode of operation and use of the mechanism for its intended purposes, as will hereinafter be fully described.

In accomplishing these and other objects of the invention, I have provided the improved details of construction, the preferred forms of which are illustrated in the accompanying drawings, wherein—

Fig. 2 is a horizontal section of the same, taken substantially on the line 2—2 in Fig. 1, showing the shifting mechanism in plan view.

Fig. 3 is a somewhat enlarged front elevation of parts of the machine shown in Fig. 2.

Figure 1:
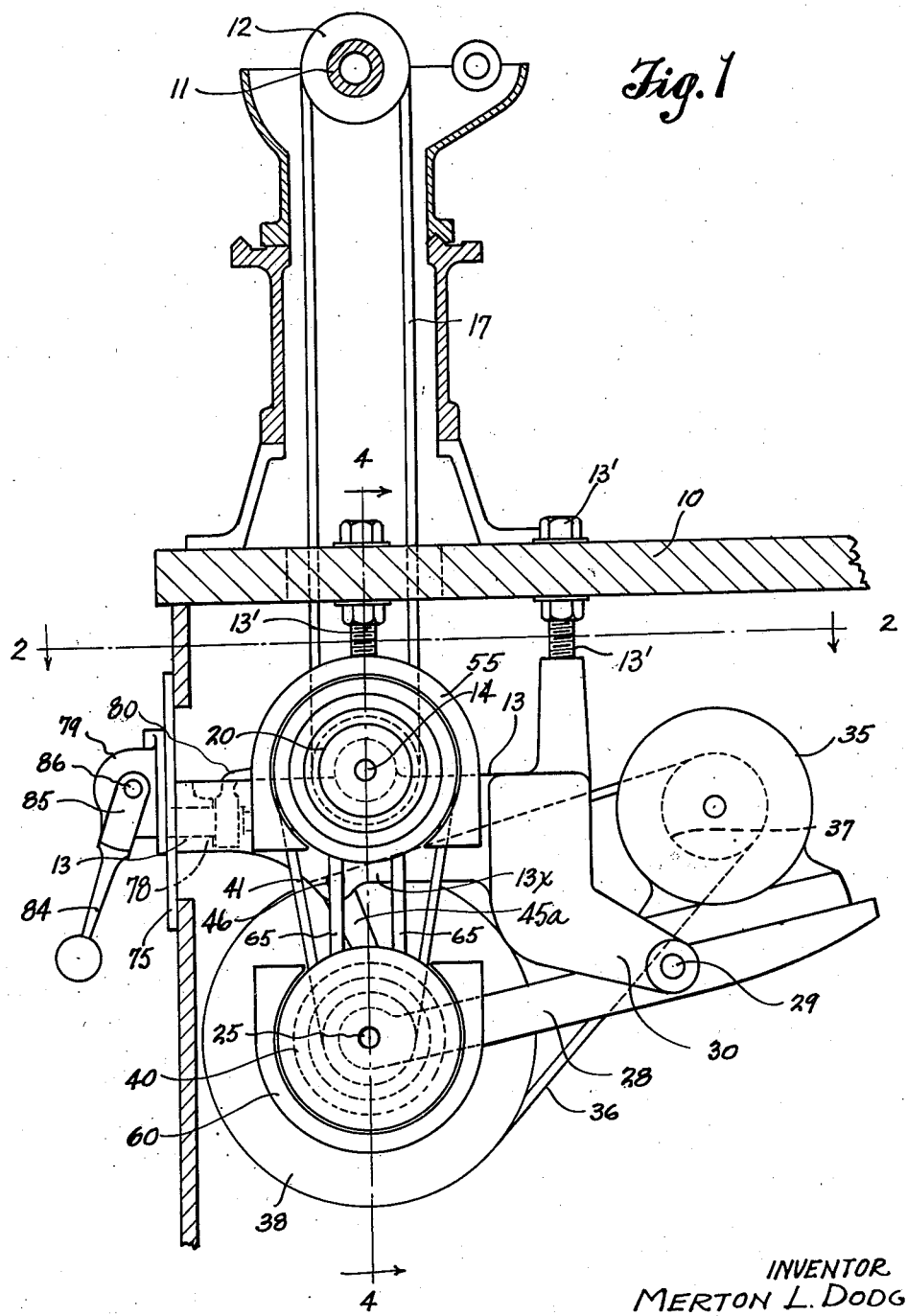
Fig. 1 is a vertical cross-section of a machine equipped with a V-belt shifting mechanism embodied by the present invention.

It is a common arrangement of parts in machines employing stepped pulleys and V-belts, to mount one of the stepped pulleys on a shaft that has a swinging support and means associated with the support for adjusting it to provide the necessary slack in the driving belt to permit its disengagement from one pair of pulley grooves and its application to another pair. However, to my knowledge, no means has heretofore been provided whereby the belt could be mechanically picked up, shifted and selectively applied to any pair or set of grooves in the complemental pulleys. Therefore, it is only to the provision of such a mechanism and its novel combination with the usually used belt slackening and tightening means that the present invention relates and to which claims will be made. The particular type of machine shown in the drawings has been selected only as a means of illustrating a typical application of the mechanism of the invention and the mode of operation of the mechanism.

Referring more in detail to the drawings—

Figure 4:
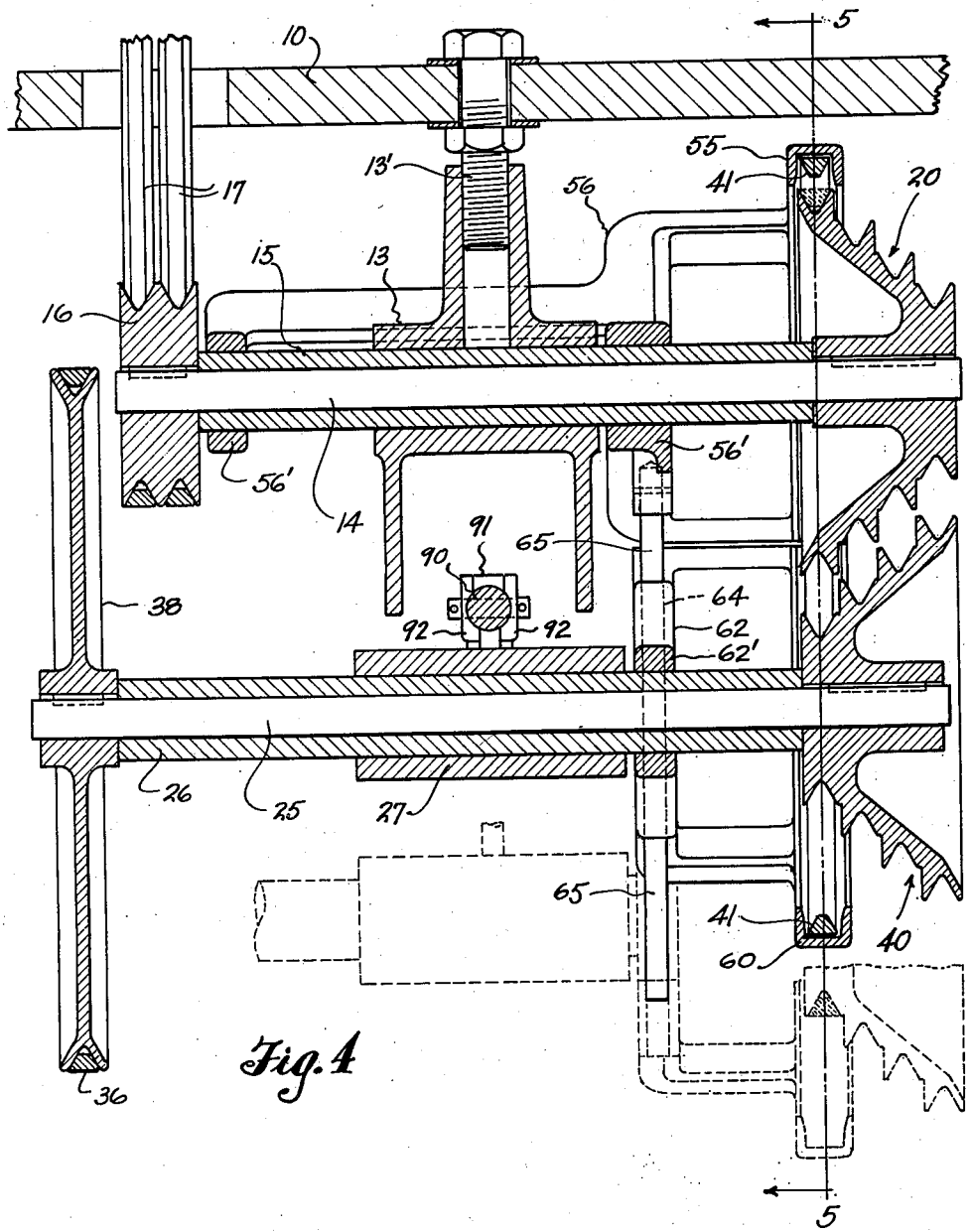
Fig. 4 is an enlarged, vertical section taken on the line 4—4 in Figs. 1 and 5.

In Figs. 1 and 4, 10 designates what may be the bench or plate on which a lathe, or similar type of machine is mounted and 11 designates a horizontal shaft which might be the spindle of the lathe and on which spindle a driving pulley wheel 12 is mounted. Fixedly attached to the bench 10, at its underside, is a horizontally disposed frame structure of T-shape in plan, as seen in Fig. 2, and designated generally in Figs. 1, 2 and 6 by numeral 13. The frame 13 is shown in Figs. 1 and 2 as being adjustably fixed to the bench 10 through the mediacy of three bolts designated by reference numeral 13'.

Rotatably mounted in the frame 13 is a horizontally disposed shaft 14. As shown in Fig. 4, shaft 14 is rotatably mounted within a tubular sleeve bearing 15 that, in turn, is fixedly secured in the frame 13, at the forward end and transversely to the stem portion thereof. The shaft 14 is parallel to and as seen in Fig. 1, is directly below the spindle 11.

The shaft 14 extends at its ends beyond the ends of the sleeve 15 and, at one end, has a pulley wheel 16 fixed thereon in alignment with the pulley wheel 12. A pair of belts 17 is shown in Figs. 1 and 4 as being extended about the aligned pulleys for the driving of the lathe spindle 11.

Keyed to, or otherwise secured on the end of shaft 14, opposite the pulley wheel 16, is a stepped V-belt pulley wheel 20, herein shown to comprise four separate steps of gradually increased diameter. This particular pulley, in the present description, will be referred to as the "driven pulley" and the shaft 14 will be referred to as the "driven shaft."

Associated with the present mechanism is a drive shaft designated by reference numeral 25 and it is shown best in Fig. 4 as being located below and parallel to the shaft 14 and to be rotatably contained in an elongated sleeve bushing 26 that is mounted in a cross bearing 27 that is formed at the forward end of a swing frame 28.

The swing frame is shown in Fig. 1 as being pivotally supported between its ends by a horizontal, pivot shaft 29 that is mounted by and extended between two spaced legs 30 and 30' that extend downwardly and rearwardly from the cross head portion of the frame 13 previously mentioned.

At its rearward end, as shown best in Figs. 1 and 2, the swing frame 28 mounts an electric motor 35 thereon and a V-belt 36 extends about a V-belt pulley 37 on the drive shaft 35' of the motor and about a larger pulley wheel 38 that is mounted on and keyed to one end of the shaft 25; this latter belt being under driving tension at all times.

Keyed on that end of the shaft 25 that is opposite the end carrying the driving pulley wheel 38, is a stepped pulley wheel 40 that is paired with and is the complement of the stepped pulley wheel 20 on the driven shaft 14. A driving connection between the pulleys 40 and 20 is provided through the mediacy of a V-belt 41 and the mechanism embodied by this invention is for the purpose of releasing, supporting, and shifting this belt and for selectively applying it to any of the pairs of grooves in the complemental pulleys. The shifting mechanism which I have provided is used in conjunction with the swing frame 28 and its actuating toggle and both the shifting mechanism and the toggle are under control of a common operating member.

It is to be understood that before the V-belt 41 can be shifted along its pulleys from one pair of grooves to another, it must first be slackened and disengaged from the pulley grooves, and that after an adjustment to a selected pair of grooves has been made, it must be seated therein and again be drawn taut. This slackening and tightening of the belt 41 is herein accomplished by the swinging of the forward end of the frame 28, toward and from the driven shaft 14. For accomplishing this swinging action, I provide a toggle linkage which, as shown in Fig. 6, comprises a bell crank lever 45, mounted pivotally on a horizontal shaft 46 that is fixedly supported at its ends in spaced parallel webs 13x formed along the under side of the stem portion of the T-shaped frame 13, as shown best in Fig. 6.

Figure 6:
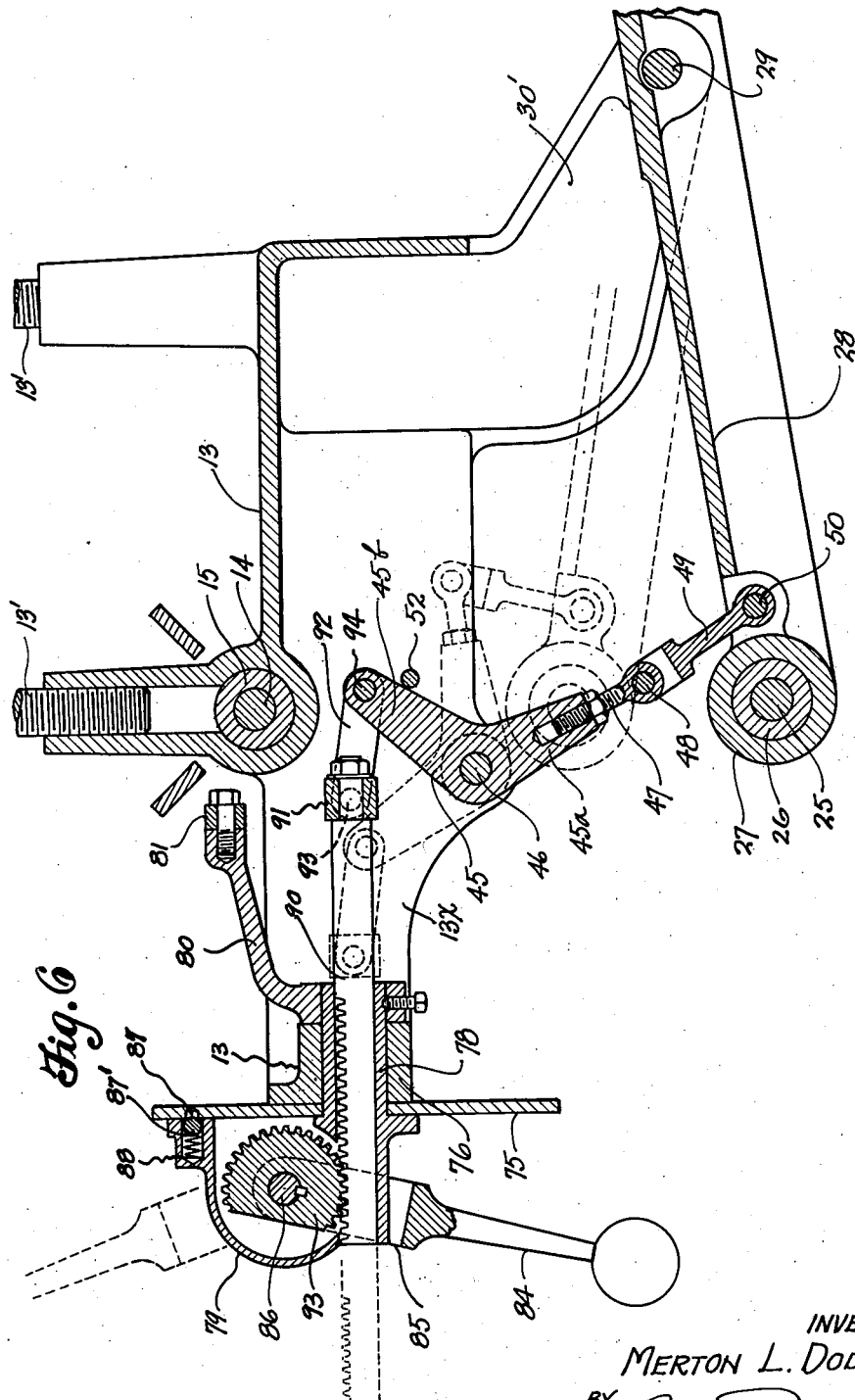
Fig. 6 is an enlarged, vertical section taken substantially on line 6—6 in Fig. 2.

It is shown in Fig. 6 that the bell crank lever 45 has an arm 45a that extends downwardly and rearwardly and at its lower end has a bolt 47 adjustably mounted therein as an extension of the arm. At its outer end, the bolt is pivotally attached by a pivot member 48, to a link 49 which, in turn, is connected pivotally by bolt 50 with the forward end portion of the swing frame 28. The other arm, 45b, of the bell crank lever 45, extends upwardly and rearwardly and at its end is operatively connected with devices later described for actuating it forwardly and rearwardly, thus to effect the raising and lowering of the forward end of the swing frame for the purpose of slackening and tightening the belt 41, as applied to the stepped pulleys 20 and 40.

When the center point of the pivotal connector 48 in the toggle linkage passes forward, slightly past a dead center line between the pivot axes 46 and 50, the upper arm 45b of the bell crank lever will engage with a stop member 52 in the frame 13 and thus the linkage will be locked against belt slackening action except by a reverse action effected through a forward pull in the upper arm of the bell crank.

The present belt shifting mechanism takes into consideration the provision for slackening and disengaging the belt 41 from both pulleys, the moving of the belt bodily to positions for application to the selected set of grooves and finally the readjustment of the swing frame to cause the drive pulley to engage the belt and thereby cause it to be drawn from the housings and seated in the selected pair of grooves.

Figure 5:
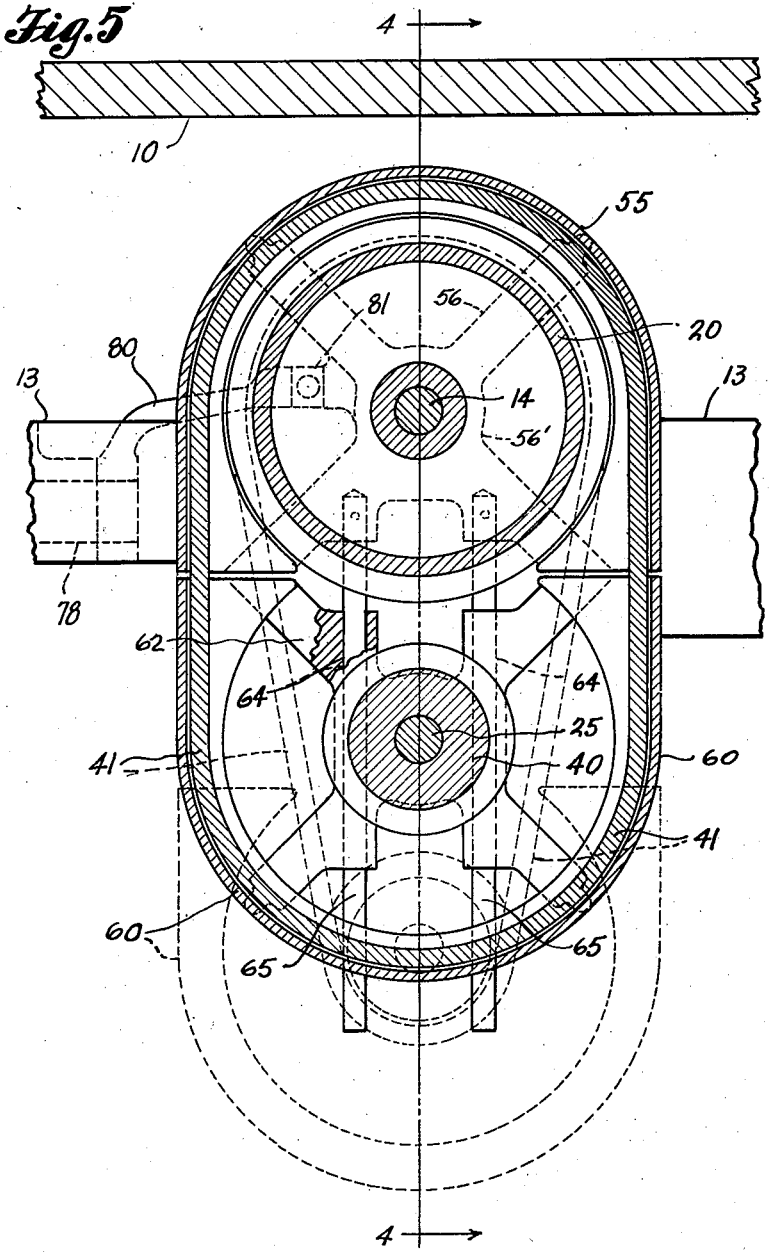
Fig. 5 is a cross-section taken on line 5—5 in Fig. 4.

The mechanism for this purpose comprises upper and lower belt-guide housings which are best shown in Figs. 1, 4 and 5. The upper belt-guide housing is designated by numeral 55 and it comprises an inverted U-shaped member of channel form, with the channel facing inwardly. This housing is of such size as to permit it to be registered with and about the step of greatest diameter of pulley wheel 20 as shown in Figs. 4 and 5. Also, this housing 55 is fixed rigidly to a supporting frame 56 that has bearings 56'—56' longitudinally slidable on the opposite end portions of the sleeve 15 in which shaft 14 is rotatably contained. The movement of this frame 56 along the sleeve in opposite directions is such that the U-shaped housing 55 may be brought selectively into alignment with any one of the pulley grooves or steps of the pulley 20.

The lower belt guide housing comprises a U-shaped housing 60 that is like, and is the complement of the guide housing 55, and this is of such size that it may be registered about the largest step of the driving pulley wheel 40. Likewise, this lower belt guide housing 60 is supported by a frame 62 having a bearing portion 62' that is mounted on and is slidable along the adjacent end portion of the sleeve 26 in which shaft 25 is rotatably contained. Also, it is shown in Figs. 4 and 5, that the bearing 62' is equipped at opposite sides of the shaft 25 with vertically bored holes 64—64 and that parallel rods 65 and 65 are fixed at their upper ends in the frame bearing 56' of the upper guide housing and have their lower end portions slidably contained in the holes 64—64 so that the two housings will be held in proper alignment with the moving of the shaft 25 toward and from the shaft 14 for the belt slackening and tightening operations as accomplished through the actuation of the toggle linkage.

It is to be explained that the two guide housings are at all times, except when shifting the belt, aligned with the pulley grooves in which the belt 41 is contained, and that whenever the swing frame 28 is actuated upwardly to slacken off this belt preparatory to shifting it, the lower guide housing 60 moves upwardly with the lower pulley wheel, as from the dotted line position to the full line position in Fig. 5, and thus the belt 41 is caused to be picked up first in the channel of the lower housing and shifted upwardly and into the channel of the upper housing as has been shown clearly in Fig. 5. Then, by shifting the housings in the axial direction along the pulleys, the belt may be brought into registering alignment with any selected pair of grooves in the complemental pulleys. After thus being brought into registration with the selected grooves, to seat it, it is only necessary to actuate the swing frame downwardly thus to swing the lower pulley wheel 40 back to its lowered position. In this downward swing of the pulley 40, it engages the lower end loop of the belt 41 and the belt is thereby drawn down from the upper guideway 55 and seated in the selected groove of the upper pulley wheel 20. Proper tension may be obtained through adjustment of belt 47 from or into the bell crank arm 45a.

The means which I have provided for the lateral shifting of the belt guide housings 55 and 60 along the pulleys is best shown in Figs. 3 and 6, wherein 75 designates a face plate that is designed to be and is here shown in Figs. 2 and 6, as fixed vertically to the forward end of the frame 13. Extended horizontally through this plate 75, and also through a bearing 76 at that end of the T-frame 13, is a tubular supporting stem 78 for a gear housing 79 that is disposed against the front face of plate 75. At its inner end, the tubular support 78 has a crank arm 80 fixed thereto, and a link 81 pivotally connects the outer end of the arm with the frame 56 of the upper belt guide housing. Thus, by a rotatable adjustment of the gear housing and its support 78, the belt guide housings will be shifted accordingly, as will be understood by reference to Fig. 3.

The rotatable adjustment of the gear housing 79 and its supporting member 78, for this above purpose, is herein accomplished through the mediacy of a lever arm 84 which is shown in Fig. 3 as having a bifurcated end providing arms 85—85 that extend to opposite sides of the housing 79 and are there secured on opposite ends of a shaft 86 that extends rotatably and directly through the housing 79. The swinging of this lever 84 about the axial line of support 78 full line position in Fig. 3 to the successive dotted line positions, causes the belt guide housings to be shifted successively into registration with the different sets of grooves of the stepped pulleys 20 and 40.

To determine the exact position of the belt guide housings for the seating of the belt 41 in a selected set of pulley grooves, I have provided the face plate 75 with a series of sockets 87 located in an arcuately curved line that is formed about the mounting axis of the housing as a center, and I have mounted a spring pressed ball 87' in a socket 88 in the housing wall as noted in Fig. 6, that will be successively seated in each of the sockets 87 as the housing is turned through its arc of movement by the lever 84. This seating of the ball will determine the stopping point and will yieldingly retain the housing in a set position.

In order that the lever 84 may also be used as the means for the actuations of the swing frame 28 to slacken off and also to tighten the belt 41, I have mounted a rack bar 90 for longitudinal movement in the tubular support 78, as shown in Fig. 6. This rack extends inwardly from the bearing 78 and at its inner end has a block 91 swivally fixed thereon. The block, in turn, is connected to the outer end of the upper arm 45b of the bell crank by a pair of links 92 which have pivotal connection at their ends respectively, with the block and lever arms, as at 93 and 94. Keyed on the mounting shaft 86 of the lever arm 84 within the housing 79, is a gear wheel 95 and this is in operating mesh with the rack bar 90. Thus, by the swinging of the lever arm, as from its full line to the dotted line showing in Fig. 6, the rack bar will be shifted outwardly, and the swing frame 28 moved upwardly, thus to slacken the belt 41 and cause it to be disposed in the belt guide housings and clear of the pulleys as in Fig. 5. After this has been done, the upwardly extending lever arm 84 is then swung toward one side or the other, to thus locate the belt in proper position for its application to a selected pair of grooves in the pulley wheels. Finally, the lever is swung back to its lower limit, as to one of the positions indicated in Fig. 6, thus to reseat the belt and draw it tight in the pulley grooves where it is functionally held by the toggle linkage until manually released for readjustment.

By this means above described, I have provided for the releasing of the belt 41 from its pulleys, for its shifting and its re-application to the pulleys, by the actuation of the single member 84.

Such a mechanism may be used in like manner for shifting of flat belts used in connection with ordinary types of pulleys.

Having thus described my invention, what I claim as new therein and desire to secure by Letters Patent is:

1. The combination with a pair of parallel shafts, V-belt pulleys mounted in alignment thereon, each having a plurality of V-belt grooves therein, a V-belt applied about the pulleys and selectively applicable to paired grooves thereof to effect a driving connection, a movable frame supporting one of the shafts, means for moving said frame to move the corresponding pulley toward the other pulley to effect the disengagement of the belt from the pulley grooves, a belt housing mounted for movement with the movable frame and adapted to receive the belt therein upon its being disengaged from the pulleys, and means for shifting said housing along the pulley to selectively register the belt as carried thereby, with any other pair of pulley grooves for the automatic seating of the belt therein when the pulleys are moved apart to a belt tightening relationship and a hand lever operable both for the actuation of the movable frame-adjusting means and for the shifting of the belt housing along the pulley shaft.

2. In combination, a pair of parallel shafts; one having a fixed support and the other having a movable support, complemental, stepped pulleys on said shafts and formed with a plurality of paired belt grooves, a belt operable about the complemental pulleys and selectively applicable to the paired grooves to effect a driving connection between the shafts, means for adjusting said movable support to disengage the belt from the pulleys, a belt housing supported by each shaft, and movable therealong, each housing partially enclosing the adjacent pulley and adapted, when the pulleys are adjusted to belt disengaging relationship, to receive the end loop portions of the belt therein and to support the belt in the clear of both pulleys and means for shifting the housings along the supporting shafts to locate the belt, as contained therein, in alignment with any of the paired grooves of the pulleys for seating therein incident to the return of the pulleys to their normal driving relationship; each belt guide housing having a supporting bearing receiving the corresponding supporting shaft therethrough for their relative rotative and longitudinal movement, one of said bearings having a bore formed therein in a plane that is perpendicular to the axial line of the shaft and the support for the other housing having a rod fixed therein and slidably contained in said bore to maintain the alignment of the housings during their adjustment and shifting of the belt.

3. In combination, a pair of parallel shafts, V-belt pulleys mounted thereon, each having a plurality of V-belt grooves, a V-belt applied about the pulleys and selectively applicable to paired grooves therein to effect the driving connection, a swing frame supporting one of the shafts for its movement toward the other to effect the disengagement of the belt from the pulleys, belt housings supported by the shafts and partially about the pulleys and movable from and toward each other with like movements of the shafts, and adapted to receive the corresponding end loops of the belt therein when it is disengaged from the pulleys, means for shifting the belt housings along the shafts to align the belt, as carried therein, with any selected pair of grooves of the pulleys, a rotatably mounted housing, a bar longitudinally movable therein, means operatively connecting the said rotatable housing with the belt guide housings whereby they will be shifted along the pulleys in accordance with its rotative adjustment, means connecting the said bar with the swing frame for effecting a relative adjustment of the pulleys incident to an endwise adjustment of the bar and a hand lever attached to the said rotatably mounted housing whereby it may be rotatably adjusted, and having an operating connection with the said bar for its longitudinal adjustment, independent of any rotative movement of the housing.

4. The combination with a pair of parallel shafts, stepped V-belt pulleys mounted thereon, a V-belt applied about the pulleys to provide a driving connection between them and a swing frame supporting one of the shafts for movement from and toward the other; of belt housings mounted on the shafts and partly about the pulleys for movement from and toward each other with the adjustment of the shafts and movable along the pulleys, and each having a groove adapted to receive the belt therein when disengaged from the pulley grooves, a fixed face plate, a gear housing rotatably mounted thereby, a rack bar mounted for endwise movement in the housing and coaxially of its axis of rotation, means operatively connecting the bar with the swing frame for its actuation by an endwise movement of the bar, means operatively connecting the gear housing with the belt housings for shifting them along the shafts, by a rotative adjustment of the gear housing, a lever fixed to the housing for rotating it and a gear on the shaft meshing with the rack bar for effecting its endwise movement, a shaft rotatably mounted in the gear housing, a gear fixed on said shaft in mesh with the rack bar, and a lever arm fixed to said shaft for effecting its rotative adjustment and for the rotation adjustment of the gear housing each independently of the other.

5. A combination as in claim 4 wherein a yieldable latch element is mounted by the gear housing, and stops are arranged on said face plate corresponding to the steps of the pulleys, and in position to be engaged by the latch, each being adapted to locate the belt guide housings in alignment with corresponding steps of the pulleys.

MERTON L. DODGE.

REFERENCES CITED

The following references are of record in the file of this patent:

UNITED STATES PATENTS

| Number | Name | Date |
| --- | --- | --- |
| 2,192,731 | Faltermayer | Mar. 5, 1940 |